April 3, 1928.  S. SULIK  1,664,906
HANDSAW
Filed Aug. 24, 1927
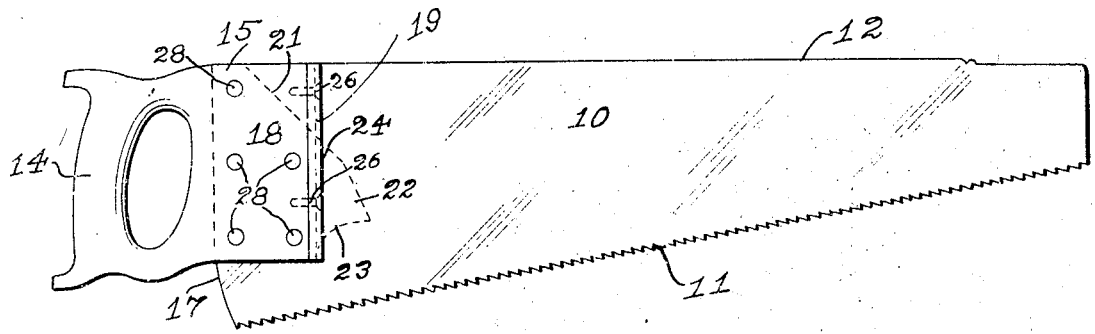
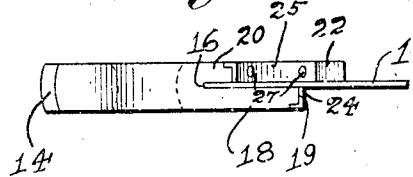
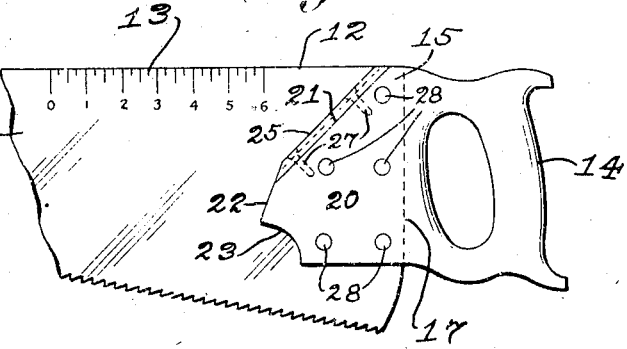
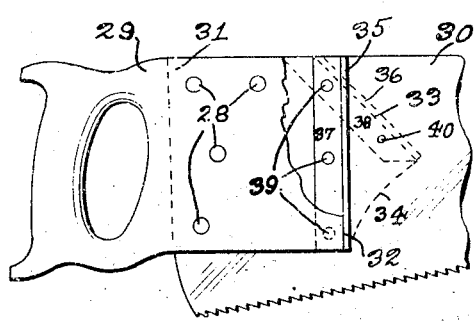
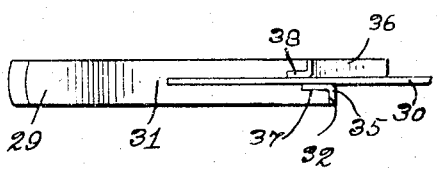
INVENTOR
Stephen Sulik
BY
H. G. Manning
ATTORNEY Patented Apr. 3, 1928.

1,664,906

UNITED STATES PATENT OFFICE.

STEPHEN SULIK, OF NEW BRITAIN, CONNECTICUT.

HANDSAW.

Application filed August 24, 1927. Serial No. 215,120.

This invention relates to combination tools, and more particularly to a handsaw having attachments for permitting it to be used as a scale, a square, and a miter.

One object of this invention is to provide square and miter attachments for a handsaw which will be rigidly held in position so that they will not lose their accuracy even after a long period of use.

A further object is to provide a device of the above nature which will be simple in construction, inexpensive to manufacture, easy to manipulate, ornamental in appearance, and very efficient and durable in use.

With these and other objects in view there have been illustrated on the accompanying drawings two forms in which the invention may be conveniently embodied in practice.

Fig. 1 represents a plan view of the first form of the invention;

Fig. 2 is an edge view of the handle end of the saw shown in Fig. 1;

Fig. 3 is a plan view of the handle end of the saw shown in Fig. 1, said view being taken from the reverse side thereof;

Fig. 4 is a plan view of the handle end of a modified form of handsaw also embodying the invention, the handle being shown partly broken away for clearness; and Fig. 5 is an edge view of the same.

Referring now to the drawings, in which like reference numerals denote corresponding parts throughout the several views, the numeral 10 indicates a saw blade having a lower slightly inclined longitudinal toothed edge 11. The blade 10 also has an upper straight edge 12 provided with a suitable scale 13 near the handle end thereof.

In order to manipulate the saw blade 10, provision is made of a handle comprising a grip portion or hand-hold 14 and a body portion 15, the latter being bifurcated as by a slot 16 extending the full width of said body portion and adapted to receive the rear end 17 of the saw blade 10. The face 18 of the body portion 15 terminates in a straight edge 19 arranged at right angles to the straight edge 12 of the saw blade 10, whereby the saw may serve as a square for enabling a carpenter or other person using the saw to utilize the straight edge 12 of the blade for laying out the work as with a pencil.

The edge of the face 20 of the body member 15 is beveled at an angle of 45 degrees with respect to the straight edge 12 to form a miter 21, said miter extending about one-half way across the handle. The edge of the face 20 projects forwardly beyond the miter 21 at an angle of about 60 degrees to the edge 12 to form a shoulder member 22, and thence extends rearwardly along a concave arc 23 to the lower edge of the body member 15. The shoulder member 22 serves as a stop to protect the beveled miter edge 21 and the square edge 19 from striking the work at the finish of the forward movement of the saw.

In order to protect the square edge 19 and the bevel edge 21 from injury during use and to prolong the useful life thereof, provision is made of a pair of metal wear strips 24 and 25, said wear strips being angular in cross-section and having their outer edges flush with the outer surfaces of the faces 18 and 20 of the handle body portion 15. The wear strips 24 and 25 are secured to the faces 18 and 20 as by screws 26 and 27 respectively.

The handle is secured to the saw blade in any desired manner, as by rivets 28, which pass entirely through the body section 15.

Referring now to the modified form of saw handle 29 shown in Figs. 4 and 5, a saw blade 30 is disclosed which is similar in all respects to the saw blade 10 described above. The handle 29, however, differs from the first form of handle in the shape of its body section 31, which in this instance has a square edge 32 on one face and a miter edge 33 and curved edge 34 on its other face, no protecting shoulder being provided in this form.

In order to protect the square edge 32 and the miter edge 33 from injury during use, provision is made of a pair of plates 35 and 36, preferably of metal, which are angle-shaped in cross-section, as before, but in this instance have their bases 37 and 38 flush with and secured to the saw blade 30 as by rivets 39 and 40 respectively.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a handsaw, a blade having a toothed edge and a straight edge, a handle having a slotted body portion for receiving the rear end of said blade, one face of said body portion having its edge perpendicular to said straight edge to form a square, the other face of said body portion having its edge inclined to said straight edge to form a miter, the edge of said other face beyond said miter extending toward the tip of the blade to form a stop for preventing said miter edge from being injured by contact with the work.

2. In a handsaw, an elongated blade having a toothed cutting edge, a handle having a bifurcated body portion with its opposite faces overlying the rear end of the blade, one face of said body portion having an inclined miter edge, and means extending from said handle to form a stop to protect said miter edge from contact with the work.

3. In a handsaw, an elongated slightly tapered blade having a toothed cutting edge and a straight edge, a handle slotted to receive the rear end of said blade and having a handgrip section, one face of the slotted section of said handle being inclined to the straight edge at 45 degrees to form a miter, the edge of said face extending beyond said miter at an angle of more than 45 degrees to the straight edge and forming a stop to protect said miter from injury.

4. In a handsaw, an elongated slightly tapered blade having a toothed cutting edge and a straight edge, a handle slotted to receive the rear end of said blade and having a handgrip section, one face of the slotted section of said handle being inclined to the straight edge at 45 degrees to form a miter, the edge of said face extending beyond said miter at an angle of more than 45 degrees to the straight edge and forming a stop to protect said miter from injury, said miter being protected from contact with the work by an angle strip.

5. In a handsaw, an elongated blade having a toothed cutting edge, a handle having a bifurcated body portion with its opposite faces overlying the rear end of the blade, one face of said body portion having an inclined miter edge, and a shoulder beyond said miter edge to protect it from contact with the work.

6. In a handsaw, a blade having a toothed edge and a straight edge, a handle having a slotted body portion for receiving the rear end of said blade, one face of said body portion having its edge perpendicular to said straight edge to form a square, the other face of said body portion having its edge inclined to said straight edge to form a miter, said square and miter edges being protected by metal plates, said plates being protected from contact with the work by means extending forwardly from said handle on the miter face thereof.

In testimony whereof, I have affixed my signature to this specification.

STEPHEN SULIK.